United States Patent Office 2,923,190
Patented Feb. 2, 1960

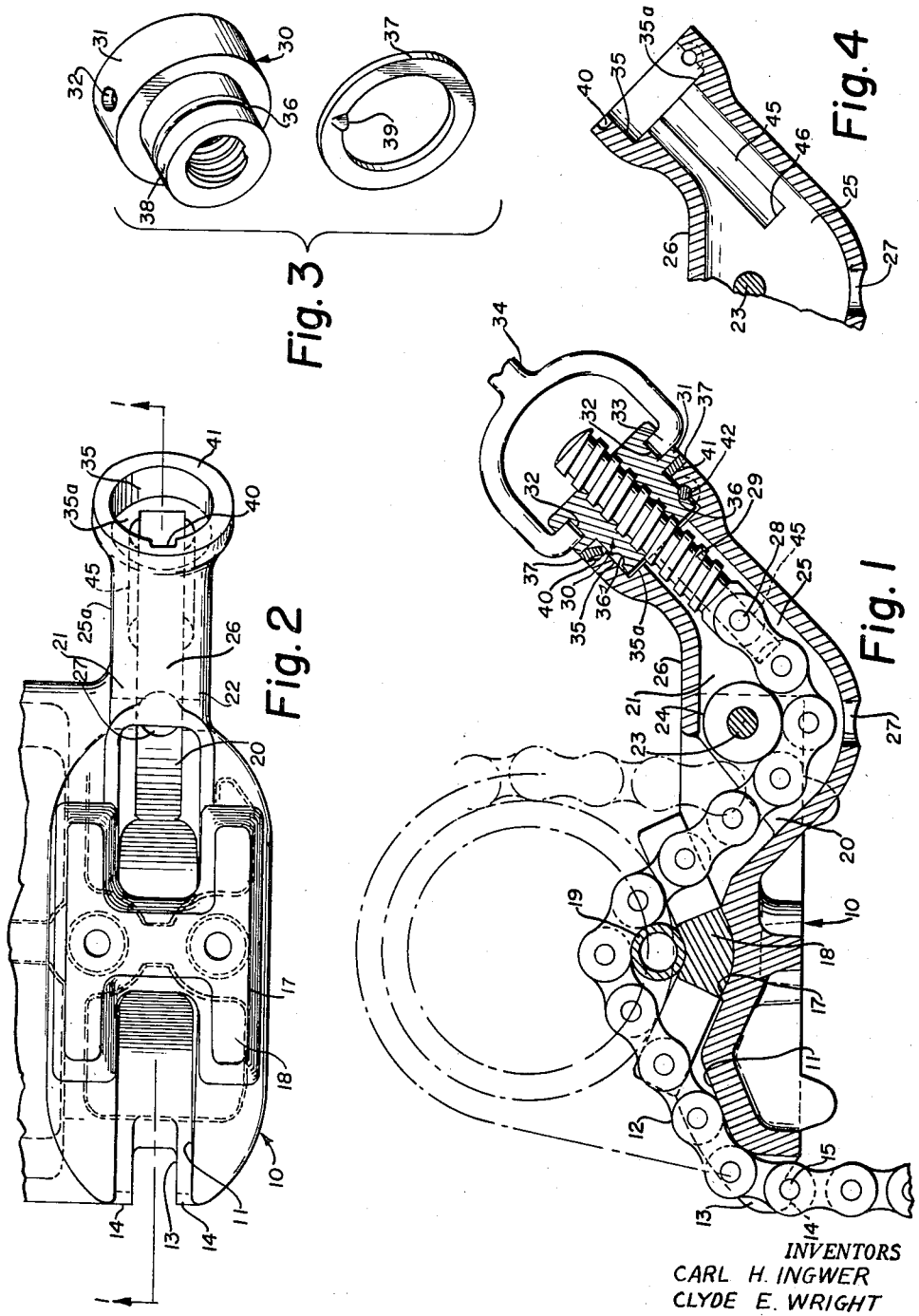

2,923,190
CHAIN-TYPE PIPE VISE

Carl H. Ingwer and Clyde E. Wright, Elyria, Ohio, assignors to The Ridge Tool Company, Elyria, Ohio Application May 22, 1957, Serial No. 660,864

3 Claims. (Cl. 81—19)

This invention relates to a pipe vise of the type in which a chain is used to clamp the pipe in place.

Various chain-type vises have been proposed heretofore in which a screw-threaded rod connected to one end of the chain is threadedly received in a nut, which may be turned to pull the chain tight against the pipe on the base of the vise. In the previous vises of this general type, the nut was not mounted on the base of the vise in a positive manner. This meant that the chain and nut usually had to be repositioned before beginning a chain-tightening operation, and this involved appreciable inconvenience in the use of such vises. Also, this made the nut and chain readily susceptible to becoming completely detached from the base, with the possibility of their becoming lost. In addition, dirt could readily get into the open end of the base where the nut operated and detract from the ease of operation of the vise.

The present invention is directed to a novel chain-type pipe vise which avoids these disadvantages and consequently improves the effectiveness with which a tool of this type can be used.

Accordingly, it is an object of this invention to provide a novel and improved chain-typpe pipe vise.

Another object of this invention is to provide a novel chain-type pipe vise in which the chain and the nut used for tightening it are positively retained on the base of the vise, thereby greatly facilitating the use of the vise.

Further objects and advantages of the present invention will be apparent from the following detailed description of a preferred embodiment thereof, which is illustrated in the accompanying drawing.

In the drawing:

Figure 1 is a longitudinal sectional view, taken along the section line 1—1 in the base of Fig. 2 and showing the complete operating mechanism of present vise with a pipe clamped in place thereon;

Figure 2 is a fragmentary top view of the base of the present vise with the clamping chain and the actuating mechanism therefor removed;

Figure 3 is an exploded perspective view of the nut and the friction ring on the present vise; and Figure 4 is a fragmentary section taken along the same line as Fig. 1, but with the clamping chain and the actuating mechanism therefor removed.

Referring to Figs. 1 and 2, the cast-iron base 10 of the present vise is formed at its left end with an upwardly facing channel 11 for receiving a chain 12. At its extremity at this end the base is cut away at 13 at the middle of this channel. On opposite sides of this cutaway portion the base presents downwardly facing hook-shaped portions 14 for engagement with a cross pin 15 on the chain 12 to hold the chain thereat.

As best seen in Fig. 2, to the right of channel 11 the base presents a recessed portion 17 that is substantially H-shaped in outline, viewed from the top. Each of the opposite legs of this H-shaped recess is generally V-shaped in vertical section, as best seen in Fig. 1. A complementally shaped support block 18 is received in the recess 17. The block 18 is substantially H-shaped, viewed from the top, and each leg of the H is substantially V-shaped in vertical section, as is the crosspiece of the H. A pipe 19 to be clamped in place rests on the top of the block 18 and extends across the crosspiece of this block at the crotch of the V, as indicated in Fig. 1.

To the right of the H- shaped recess 17 in Figs. 1 and 2 the base 10 presents a downwardly inclined channel 20 which is open at the top to pass the chain 12. The base has opposite side walls 21 and 22 which support a cross pin 23 on which is rotatably mounted a roller 24. The chain 12 passes down around the roller 24 and then up into an upwardly inclined passage 25 formed in an upwardly directed tubular extension 25a of the base. Above the roller 24 the base presents a solid top wall 26. Except for a small opening 27 directly below the roller 24, the bottom of the base is imperforate at the downwardly inclined channel 20 and the upwardly inclined passage 25. The opening 27 is not large enough to pass the chain 12, so that there is no possibility of the chain's dropping out the bottom of the base 10.

The end link of the chain 12 is pivotally connected, by means of a cross pin 28, to one end of a screw-threaded stem or rod 29. This stem is threadedly received in the threaded bore of a nut 30. The nut 30 has an outer transverse head 31 provided with opposite openings 32 for receiving the oppositely disposed fingers 33 of a handle 34 by which the nut may be turned.

A reduced neck 38 of the nut 30 extends into a counterbore 35 at the end of the tubular extension 25a of the base, as shown in Fig. 1, and at its inner end terminates a slight distance from a flat annular shoulder 35a formed at the juncture of passage 25 and the counterbore 35. The nut 30 is formed with a peripheral groove 36, which is positioned approximately midway along the counterbore 35.

A friction ring 37 of steel or other suitable material extends loosely around the reduced neck 38 of the nut 30. This ring has an axially protruding dimple 39 which engages in a recess 40 formed in a flat circular end face 41 of the base extension 25a to prevent the friction ring from turning with respect to the base.

A pin 42 is press-fitted in the wall of the base extension 25a at the counterbore 35 and projects into the groove 36 on the nut 30 to retain the nut against being withdrawn from the counterbore 35 in the base extension 25a.

At its opposite sides the passage 25 in the base is formed with grooves 45 which extend down from the shoulder 35a and terminate at their lower ends in transverse shoulders 46, as best seen in Fig. 4.

In order to assemble the chain on the base, the end link of the chain is pulled up through the passage 25. The cross pin 28 is inserted freely through this end link and the inner end of the stem 29 to connect the stem to the chain. The opposite ends of the pin 28 project laterally beyond the chain for reception in the grooves 45 at opposite sides of the passage 25 in the base. The stem 29, with the nut 30 and friction ring 37 in place thereon, is dropped down into the passage 25. The shoulders 46 at the lower ends of the grooves 45 limit the inward movement of the stem. Following this, the cross pin 42 is inserted in place to lock the nut 30 axially in place on the base.

In use, the inner face of the friction ring 37 engages the flat, circular end face 41 at the outer end of the counterbore 35 in the base extension 25a, and the outer end flange 31 on the nut 30 bears against the outer face of the friction ring. The inner end of nut 30 is spaced slightly from the inner end wall 35a of the counterbore 35. When the handle 34 is turned, the nut 30 turns with it to draw the stem 29 up and pull the chain 12 tight against the pipe 19. The outer end flange 31 on the nut rides frictionally over the outer face of the friction ring 37. The friction ring is held against turning because of the engagement of its dimple 39 in the recess 40 on the end of the base extension 25a.

From the foregoing, it will be apparent that the illustrated device provides an extremely effective arrangement whereby the chain and its actuating mechanism are positively mounted on the base of the vise in such a manner that they are conveniently positioned for the start of a pipe-clamping operation. Also, the chain and its actuating mechanism are quite readily and conveniently assembled by virtue of the novel structural arrangement in the present tool.

It is to be understood that, while there has been described herein and illustrated in the accompanying drawing a particular preferred embodiment of the present invention, various modifications, omissions, and refinements which depart from the disclosed embodiment may be adopted without departing from the function and scope of this invention.

We claim:

1. A pipe vise comprising a base having provision for supporting a pipe to be clamped in place, a chain for clamping such a pipe on the base, said base having an upwardly inclined passage and a counterbore which forms an extension of said passage and terminates at one end of the base, a screw-threaded stem connected to one end of the chain and extending therefrom up through said passage, a nut threadedly engaging said stem, said nut having an outer transverse flange and a portion extending inward from the outer flange into said counterbore from said end of the base and terminating at its inner end adjacent the inner end of said counterbore, said nut being formed with a peripheral groove disposed within said counterbore, a friction ring extending around said inwardly extending portion of the nut and engaged between said outer flange of the nut and said end of the base, said end of the base having a recess therein and said friction ring having a protrusion received in said recess to prevent the nut from turning with respect to the base, a retainer mounted on the base at said counterbore and extending into said groove in the nut to lock the nut against withdrawal from said counterbore in the base, said base being formed with grooves at opposite sides of said inclined passage which extend down along said passage from said counterbore in the base and terminates at their lower ends in transverse shoulders, and a cross pin extending freely through said one end of the chain and said stem to connect them together and projecting into said grooves.

2. A pipe vise comprising a base for supporting a pipe to be clamped in place, an elongated flexible member for clamping such a pipe on the base, said base having a passage which is open at one end and grooves at opposite sides of said passage which extend inward along the passage from the open end thereof and terminate at their inner ends in transverse shoulders, a screw-threaded stem extending outward through said passage to the open end thereof, a cross pin extending through one end of said flexible member and the inner end of said stem to connect them together, said cross pin projecting into said grooves, and a nut threadedly engaging said stem at the open end of said passage.

3. In a pipe vise having a base for supporting a pipe to be clamped in place, an elongated flexible member for clamping such a pipe on the base, said base having a passage which is open at one end, a screw-threaded stem extending outward through said passage to the open end thereof, and a nut threadedly engaging said stem at the open end of said passage, the improvement which comprises: means on the base defining a groove at one side of said passage which extends inward along the passage from the open end thereof and terminates at its inner end in a transverse shoulder, and a cross pin extending through one end of said flexible member and the inner end of said stem to connect them together, said cross pin projecting into said groove.

References Cited in the file of this patent

UNITED STATES PATENTS

| 1,410,553 | Cox | Mar. 28, 1922 |
| 1,638,918 | Clark | Aug. 16, 1927 |
| 1,666,173 | Heide | Apr. 17, 1928 |
| 2,363,319 | Hanson | Nov. 21, 1944 |
| 2,724,295 | Persson | Nov. 22, 1955 |

FOREIGN PATENTS

| 233,917 | Switzerland | Dec. 16, 1944 |